United States Patent [19]

Gabrick

[11] Patent Number: 5,104,548

[45] Date of Patent: * Apr. 14, 1992

[54] CONTROLLING AND RECOVERING OIL SPILLS FROM THE ENVIRONMENT

[76] Inventor: Albert Gabrick, 2118 Treeridge Cir., Brea, Calif. 92621

[*] Notice: The portion of the term of this patent subsequent to Jul. 17, 2007 has been disclaimed.

[21] Appl. No.: 550,946

[22] Filed: Jul. 11, 1990

Related U.S. Application Data

[63] Continuation-in-part of Ser. No. 390,170, Jul. 17, 1990, Pat. No. 4,941,978.

[51] Int. Cl.$^5$ ............................................. C02F 1/28
[52] U.S. Cl. ........................................ 210/680; 134/7; 210/693; 210/924; 431/2
[58] Field of Search .................... 134/7; 210/671, 680, 210/693, 242.4, 924; 431/2

[56] References Cited

U.S. PATENT DOCUMENTS

| | | | |
|---|---|---|---|
| 3,518,183 | 6/1970 | Evans | 210/693 |
| 3,630,891 | 12/1971 | Peterson et al. | 210/680 |
| 3,819,514 | 6/1974 | Clampitt et al. | 210/693 |
| 4,066,539 | 1/1978 | Hachisu et al. | 210/693 |

Primary Examiner—Ivars Cintins
Attorney, Agent, or Firm—Plante, Strauss, Vanderburgh & Connors

[57] ABSTRACT

There is disclosed a method for treatment of an oil slick resulting from an oil spill on a body of water. The oil slick is treated with a mixture of a granular elastomeric gum comprising a block copolymer of ethylene/butylene and styrene and an oleochemical synthetic wax, the latter being used in amounts of from 1 to 33 weight percent of the mixture. The adsorbent mixture has a low density, typically from 14 to about 15 pounds per cubic foot and will absorb oil and form a dry solid which has a non-tacky and non-oily surface. The adsorbent mixture is broadcast on the surface of an oil slick in proportions from about 0.2 to about 1 part per weight part of oil. The wave action on the body of water is generally sufficiently turbulent to admix the adsorbent with the oil of the oil slick, resulting in the formation of floating solids which are dry to the touch and which have a non-oily, non-tacky surface. These solids can be readily recovered from the water or from a shoreline after they have washed ashore.

9 Claims, No Drawings

5,104,548

CONTROLLING AND RECOVERING OIL SPILLS FROM THE ENVIRONMENT

RELATIONSHIP TO OTHER APPLICATIONS

This application is a continuation-in-part of my copending application, Ser. No. 390,170, filed July 17, 1990, now U.S. Pat. No. 4,941,978, issued July 17, 1990.

BACKGROUND OF THE INVENTION

1. Field of Invention

This invention relates to a method for controlling and recovering oil spills from bodies of water and, in particular, for preventing oil contamination of shorelines.

2. Brief Statement of the Prior Art

The increasing demand of the industrial countries for energy sources has resulted in greatly accelerated shipments of imported oil and the increasing concern to protect the environment has greatly intensified the search for safe and efficient oil transportation. The threat of oil spills cannot be eliminated so long as industrial countries remain dependent on oil as an energy source, and this threat will be present for the foreseeable future. Sound management may minimize the frequency of the occurrences of oil spills, but will never completely eliminate them. An effective method of containment and recovery of oil spills from bodies of water such as rivers, lakes and seas is thus in urgent need.

Various techniques have been proposed for protection of coastlines from oil contamination resulting from spills of oil from tanker vessels. The current practice is to contain the oil with floating barricades. These techniques utilize floating booms which are interconnected to form a barricade against movement of the oil. Some techniques have been provided to skim the surface of the water to recover the oil. All of these techniques are not very effective. The surface of the water is usually too turbulent for efficient recovery and skimming operations and the oil slick often breaks through the various containment barriers which are erected. The oil emulsifies with the water, its volatile constituents evaporate, and a thick oily residue is formed on the water surface which defies recovery with conventional handling techniques and equipment. When that residue reaches a shoreline, it forms a tacky coating on all solid surfaces it contacts, and that coating is extremely difficult to remove. Following a major oil spill, which usually occurs near a shoreline, there is an unavoidable contamination of the coast with oil, at substantial peril to marine and aquatic life and requiring costly and labor intensive efforts for its removal.

Various materials have been suggested as absorbent for an oil slick. The best and most widely used absorbent is straw, and the new media has shown heroic efforts being made in attempts to absorb oil with straw. The results have been pitiful. Heretofore, no material has been provided which has the desirable, or even necessary, characteristics for this application. The materials which have been suggested do not absorb the oil and do not provide a non-sticky or dry adsorbate. Additionally, the materials are often of greater density than oil or water and will immediately sink away from the surface and the oil slick.

OBJECTS OF THE INVENTION

It is an object of this invention to provide a method for preventing the contamination of a shoreline with oil from an oil slick.

It is a further object of this invention to provide a simple and efficient method to absorb oil from an oil slick.

It is also an object of this invention to provide a method utilizing an absorbent which will absorb oil from water including sea water and form a dry composition.

It is an object of this invention to convert an oil slick on a body of water to a dry agglomerated powder.

It is further an object of this invention to provide a method for the recovery of oil from the surface of a body of water.

Other and related objects will be apparent from the following description of the invention.

BRIEF STATEMENT OF THE INVENTION

In my prior patent, I disclosed and claimed a method for treatment of an oil slick resulting from an oil spill on a body of water, in which the oil slick is treated with a granular elastomeric composition comprising a block copolymer of styrene and an ethylene elastomer, particularly ethylene/butylene. The polymer structure is preferably a triblock copolymer of ethylene/butylene copolymer which has end blocks of polystyrene, thus providing an elastomeric middle block. The amount of styrene is preferably 29 percent of the triblock polymer. The polystyrene endblocks are mutually attracted, resulting in a "physical crosslinking" which, of course, decreases when an oil is absorbed by the triblock polymer. I have now found that the action of this granular elastomeric composition is enhanced by the presence of an oleochemical base synthetic wax, specifically that available under the designations SPRAYBUSTER ® and KEMESTER ® from Witco Chemical Corp., 277 Park Ave., New York, N.Y. 10017. The synthetic waxes are long chain polymers, principally of ethylene block polymers which are available in solid particulate or powder form.

It is preferred to use the particulate form, as that form is more conductive to recover than the powder form. The specific gravity of both materials, i.e., the granular elastomeric block copolymer and the synthetic wax is less than that of water, insuring that the entire treatment composition will float on water, adsorbing the oil and forming a dry solid material which has a non-tacky and non-oily surface. The mixture of the elastomeric block copolymer and the synthetic wax is broadcast on the surface of an oil slick in proportions from about 0.2 to about 1 part per weight part of oil. The wave action on the body of water is generally sufficiently turbulent to admix the absorbent with the oil of the oil slick, resulting in the formation of floating solids which are dry to the touch and which have a non-oily, non-tacky surface. These solids can be readily recovered from the water or from a shoreline.

DESCRIPTION OF PREFERRED EMBODIMENT

This invention comprises the treatment of an oil slick on a body of water with a unique absorbent mixture which forms a dry, non-oily and non-tacky adsorbate when contacted with oil. The solid adsorbent mixture is broadcast or otherwise distributed across the surface of the body of water. This can be accomplished manually, from small boats when treating small to moderate sized oil slicks. In instances where the oil has spread over a wide area, the solid can be readily broadcast over the surface of the oil slick with conventional airplanes or helicopters.

The solid adsorbent mixture is distributed over the oil in weight proportions from 0.1 to about 1.5 parts per part of oil, preferably from about 0.25 to about 0.75 parts per part of oil.

The solid absorbent mixture should be dispersed over the oil as quickly as possible, following the release of the oil on the surface of the water. As the oil is weathered by exposure to the sea and by evaporation, it will become less and less amenable to the treatment. Accordingly, it is preferred to treat the oil before it has weathered more than one day, and, most preferably within hours of the spill.

The particular mixture which is useful in the invention is a mixture of an oleochemical synthetic wax, which is available under the trade designation as Kemester ® and Spraybuster ® from Witco Chemical Corp., 277 Park Ave., New York, N.Y.; and a granular elastomeric gum rubber comprising a block copolymer of styrene and an ethylene elastomer, particularly ethylene/butylene, which is available under the trade designation of Kraton ® G-1652 from the Shell Chemical Company, Houston, Tex.

The granular elastomeric block copolymer has a physical property similar to gum rubber and is an elastomeric block copolymer of ethylene and styrene. The material has a very low density, typically from 14 to about 15 pounds per cubic foot and is available in a granular state, typically having a particle size with an average particle size from 700 to 1000 microns average diameter. It is known as a modifier for oils and has been mixed with oils at elevated temperatures to prepare mixtures which gel upon cooling, typically forming greases, or when used at low concentrations, to modify the viscosity of oils.

The granular elastomeric gum rubber can be used alone, as it is quite effective for adsorption of oil slicks. Its effectiveness, however, can be enhanced by the presence of the oleochemical synthetic wax, which assists the adsorption of the oil by breaking up the oil slick and dispersing the granular elastomeric gum rubber particles throughout the slick. The oleochemical synthetic wax is a linear chain, ethylene polymer which has a density less than water, so it floats on the water surface, where it is most effective. The preferred oleochemical synthetic wax is that which is available under the aforementioned Kemester ® and Spraybuster ® tradenames from Witco Chemical Corp.

The oleochemical synthetic wax used in the mixture in amounts sufficient to provide a mixture which contains from 99 to 67 weight percent granular elastomeric gum rubber and from 1 to 33 weight percent oleochemical synthetic wax. The lower concentrations of the oleochemical synthetic wax are most preferred, as mixtures containing higher concentrations of the oleochemical synthetic wax do not function significantly better than mixtures containing less of the oleochemical synthetic wax. Accordingly, it is preferred to use mixtures which contain from 99 to 95 weight percent of the granular elastomeric gum rubber and from 5 to 1 weight percent of the oleochemical synthetic wax.

The absorption of the oil by the adsorbent mixture of the elastomeric gum and oleochemical synthetic wax proceeds quite rapidly and complete absorption will be achieved within about 10 to 15 minutes and in no instance later than approximately 1 hour after the treatment. Although wave action on the surface of the body of water will aid dispersion and contacting, such agitation is not required. The absorption is so effective that it proceeds rapidly even with quiescent bodies of water. This absorption efficiency is believed to result from the high absorbency and low density of the particular elastomeric gum polymer, which is enhanced by the dispersive action of the oleochemical synthetic wax.

After contacting of the absorbent mixture with the oil slick, a dry solid adsorbate is formed which floats on the surface of the water and can be easily recovered. Preferably, the adsorbate solid is contained and collected with conventional floating oil booms and is skimmed from the surface of the water with skimming barges or other equipment. The adsorbate solid is readily recoverable as its surface is dry and free of oily or tacky properties. Accordingly, the skimming and recovery equipment does not become clogged with oil crusts or oil deposits.

In the event that any of the adsorbate solids are washed onto a beach or shoreline, the solids can be readily removed since the adsorbate solids are free flowing and do not stick or adhere to sand, rocks and the like. Accordingly, the adsorbate solids can readily be recovered by sweeping or vacuuming of the shoreline.

The following examples will illustrate the practice of the invention and demonstrate results obtainable thereby.

EXAMPLE 1

In the following series of experiments, a 750 milliliter sample of the selected water was placed in a glass vessel, and approximately 70 to 100 milliliters of the selected oil were poured onto the water. Thereafter, the indicated quantity of the solid absorbent was added. In each experiment, the vessel contents were permitted to stand in a quiescent state and the condition of the liquid was noted during the experiment.

In the first experiment, seawater was placed in the vessel, 70 milliliters of crude oil was poured onto the seawater and thereafter the granular elastomeric gum rubber absorbent (Kraton ® G-1650D) was scattered on the surface of the oil floating on the water. After a period of five minutes it was noted that all of the oil had been completely absorbed onto the solid absorbent and the seawater was clear and free of oil, with a dry solid and granular adsorbate floating on its surface. The solid was readily removed from the surface of the seawater as a dry solid which left no oily residue on one's hands. The seawater after separation of the solid absorbent was clear and exhibited no residue of the crude oil.

EXAMPLE 2

The procedure of Example 1 was repeated, however, a solid blend of 15 weight parts of Kemester ® (oleochemical synthetic wax) and 150 weight parts of Kraton ® G-1650D (granular elastomeric gum rubber) was used. It was observed that the oil slick on the water broke into small globules which were adsorbed by the adsorbent mixture more quickly than in Example 1. It was also observed that the surface of the water after removal of the solid absorbent appeared to be cleaner than that observed in Example 1.

EXAMPLE 3

The procedure of Examples 1 and 2 were repeated using fresh water and the same improvement in treatment with the mixture of granular elastomeric gum rubber and oleochemical synthetic wax was observed.

EXAMPLE 4

The procedure of Examples 1 and 2 were repeated with variations in the proportions of the granular elastomeric gum rubber and the oleochemical synthetic wax. The proportions which were tested were 1 weight part of the oleochemical synthetic wax for 3 weight parts of the granular elastomeric gum rubber (33 weight percent); and 1.5 weight parts of the oleochemical synthetic wax for 150 weight parts of the granular elastomeric gum rubber (1 weight percent). It was observed that the mixture containing 1 weight percent of the oleochemical synthetic wax was equally effective as that containing 33 weight percent of the oleochemical synthetic wax.

EXAMPLE 5

The procedures of Examples 1 and 2 were repeated using gasoline rather than crude oil. The solid adsorbates which were formed from both experiments congealed into homogeneous thin brown-colored crusts which could be readily picked up off the surface of the water. Again, the mixture of the granular elastomeric gum rubber and oleochemical synthetic wax appeared to adsorb the oil more effectively, leaving a cleaner appearing water surface than did the granular elastomeric gum rubber used alone.

EXAMPLE 6

The procedure of Example 1 was repeated using a lubricating oil of 10/30 weight designation. Again, the mixture of granular elastomeric gum rubber and oleochemical synthetic wax left a water surface which appeared cleaned than that obtained using the granular elastomeric gum rubber alone.

EXAMPLE 7

The procedure of Example 1 was repeated using a commercial oil absorbent (Oil Absorbent marketed by 3M Occupational Health and Safety Products Division). The material absorbed most, but not all of the oil, and a visible oil slick remained on the water surface following treatment.

EXAMPLE 8

The procedure of Example 1 was repeated using various solid adsorbents, including ground corn cobs, clays, silicates. In all cases, these adsorbents failed to absorb all the oil, and in most cases, a considerable quantity of oil remained on the surface of the water after removal of the solid absorbent.

EXAMPLE 9

The procedure of Example 1 was repeated using another Kraton rubber product; Kraton 1101D, which is a thermoplastic elastomeric styrene-butylene-styrene triblock copolymer. The material absorbed most, but not all of the oil, and a visible oil slick remained on the water surface following treatment. Additionally, the solid removed from the water had an oily and tacky surface, and left a residue of oil on surfaces which it contacted.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method of preventing oil contamination of an environment by uncontrolled spills of mineral oil and fractions of mineral oil on bodies of water in said environment, which comprises:
   a. applying to the spill an adsorbent mixture in an amount from 0.1 to about 1.5 weight parts per weight part of said oil, said absorbent mixture consisting essentially of:
      (1) from 99 to 67 weight percent of subdivided particles of an elastomeric gum, consisting essentially of a styreneethylene/butylene diblock or triblock copolymer containing from 20 to about 40 percent styrene;
      (2) from 1 to 33 weight percent of subdivided particles of oleochemical synthetic wax;
   b. permitting said particles of said adsorbent mixture to mix with said oil and to absorb said oil thereon and form a low density solid adsorbate, having a nonoily and non-tacky surface, which floats on said body of water; and
   c. gathering said solid adsorbate and removing it from said water.

2. The method of claim 1 wherein said oleochemical synthetic wax is a linear chain, ethylene polymer which has a density less than water.

3. The method of claim 1 wherein said body of water is a sea on which an oil slick is formed by said uncontrolled spills, and wherein said particles of said copolymer are broadcast onto said spill.

4. The method of claim 3 wherein said solid adsorbate is skimmed from said sea.

5. The method of claim 3 wherein said solid adsorbate is permitted to accumulate on at least a portion of a shoreline and is removed therefrom as a dry, non-tacky solid.

6. The method of claim 1 wherein said body of water is a lake or river.

7. The method of claim 1 wherein said oil is crude oil.

8. The method of claim 1 wherein said oil is a crude oil distillate fraction.

9. The method of claim 1 including the step of burning said particles after recovery from said body of water.

* * * * *